United States Patent Office 3,148,125
Patented Sept. 8, 1964

3,148,125
CLEAR LIPSTICK
Sabbat John Strianse, Caldwell, and Mark Havass, North Bergen, N.J., assignors to Yardley of London, Inc., New York, N.Y.
No Drawing. Filed Mar. 22, 1961, Ser. No. 97,414
12 Claims. (Cl. 167—85)

This invention relates to cosmetic lipsticks which, besides carrying color for staining the lips, and a vehicle for the color, have a body sufficiently strong and stable to permit its use as an applicator and yet capable of rubbing off onto the lips a film adapted to color and protect the lips and to leave an attractive well groomed appearance.

For roughly forty years American women have been enjoying lipsticks such as we know them today. Such lipsticks, in general, are made of an oily vehicle comprising fat or oil stiffened to a desired consistency with waxes of various types, which also serve to raise the melting point and improve the physical stability. The color is ordinarily provided by insoluble pigments, or "lakes," finely dispersed in the vehicle and also one or more fluorescein dye derivatives which serve to stain the lips. A solvent for the dye, herein called a "bromo-solvent," is included for increasing the effectiveness of this staining on the lips.

These older lipsticks have had the rather dreary, dead opacity of a wax crayon. By our present invention, we have created a novel lipstick which needs no opaque pigments, but only soluble or solubilized dyes, and which may be free from all opaque materials, so that light shines through it giving it a sparkle and a depth of color like a clear precious gem e.g., a ruby. Thus it not only fills milady's cosmetic needs, but it is much more attractive in itself as a cosmetic stick. Other advantages are also attained by our invention, some of which will appear more fully below.

The lipstick of our invention incorporates U.S. Government approved dyestuffs, and at relatively low concentrations, and yields, upon application to the lips, a proper transfer of color from the body of the stick to the lips. Our new lipstick attains a desirable balance among the several important properties:

Structural strength and stability,
Facility of transfer of a film of the vehicle carrying the color,
Effective lip stain and desirable colors,
Freedom from deleterious effects.

The most important function of a lipstick, of course, is to color the lips. We therefore use in our new stick dyes that stain and color the lips with the desired color. We achieve this adequately at relatively low concentrations of dye, i.e., we extend the efficiency of such dyes for staining the lips by incorporating solvents for the dyes, which are also compatible with the vehicle and thus, may serve also other functions in the clear, stiffly gelled vehicle. Oil soluble dyes can be used directly because of the oily nature of the vehicle; but, with this invention, the hydrophilic dyes can also be used with desirable results not heretofore obtainable.

Other solvents which may be added in the gelled vehicle improve the efficiency of staining insofar as they further the dissolving of the dyestuff. Among such solvents are, for example, mono alkylolamide of mixed fatty acids derived from vegetable oil, especially peanut oil fatty acids (Loramine OM-101), di-propylene glycol methyl ether (Dowanol DPM).

Water soluble dyes, such for example, as FD&C Red #3, can be incorporated instead of the oil soluble dye or for additional color effect. Such water soluble dyes are made more compatible in the vehicle by using co-solvents, e.g., ethanol, methanol and propanol, both n-propanol and more especially, iso propyl alcohol, n-butanol, and the like.

The use of the anhydrous lower aliphatic alcohols in amount from two to ten percent also can serve an important function in our lipstick for control of syneresis, to give a stick which is stable and retains its attractive limpid appearance.

The structural aspects of the lipstick are based upon solid polyamide resin, which we use in the composition. The resin is a solid but soluble condensation product of an aliphatic dicarboxylic acid and a diamine (inclusive of compounds having more than two carboxyl and amino groups, respectively), the carboxyl and amino groups of adjacent mono units being condensed to an amide linkage in the polymer. Suitable resins of this type are available commercially from General Mills, Inc., under the trade name "Versamid," and from Olin Mathieson Chemical Corp., under the trade name "Omamid," e.g. Omamid "S" or Omamid "C," tough thermoplastic resins of the polyamid type insoluble in water and in many ketones and ester solvents, but soluble to varying extents in organic solvents such as carboxylic acid amines, alcohols and chlorinated solvents, depending upon the particular acids and amines which enter into the resin structure and also upon the polymer length.

The resin is solid and therefore is composed primarily of polyamides of molecular weight or weights within the range from about 2000 to about 10,000. These solid resins may be compounded with similar polyamides which are liquid (including "semi-liquid" or "semi-solid") at room temperatures, in the range of molecular weights of from 600 to 800. The amount of the latter is sufficiently low to give a solid stick. The structural characteristics of the stick can be varied over a considerable range of selection of the resins which are thus blended.

These resins are of the general type of polyamides set forth in U.S. Patent 2,450,940 and are commercially available, e.g. under the trade names Versamid (General Mills, Inc.) and Omamid (Olin Mathieson Chemical Corp.).

Other properties of these resins appear as follows:

| Resin Type | 900 | 930 | 940 | 950 | C | S |
|---|---|---|---|---|---|---|
| Specific gravity | .98 | .98 | .98 | .98 | .97–.99 | .94–.96 |
| Color, Gardner | 12 | 12 | 12 | 12 | 12–14 | 11–12 |
| Melting point, °C | 180–190 | 105–115 | 105–115 | 95–105 | | |
| Softening point, °C. (ring and ball) | | | | | 90–100 | 100–120 |
| Viscosity, Brookfield @ 150° C., solid #2 Spindle | | 30–45 | 15–30 | 7–15 | 32–52 | 55–75 |
| Acid value | | | | | L2 | L2 |
| Amine value [1] | 3 | 3 | 3 | 3 | | |

[1] "Amine value" is the weight of KOH, in milligrams, equivalent to the Free amine groups in one gram of the resin.

"Versamid" polyamid resins are identified as thermoplastic condensation products of polymerized linoleic acid with various polyamine compounds such as ethylene diamine, diethylene triamine, etc. Resins of 6,000–9,000 have been found advantageous for the present invention. These resins are commercially available in hard, brittle resin (#900) of melting point 180–190° C., tough flexible resins (#930 and 940) melting points 105–115° C., and even softer products of lower melting points.

Such polyamide resin alone can be molded into a stick, but it would be a brittle product unsuited for lipstick. We have found that it can be modified to have good properties for our purpose by compounding with softening agents, such as polyamide solvents of the type exemplified by the lower aliphatic alcohols in combination with the other polyamide solvents discussed herein, such as fatty acid esters, e.g., glycol esters or higher fatty acids (especially between $C_{12}$ and $C_{18}$, especially propylene glycol mono laurate, polyethylene glycol (400) mono laurate, caster oil, lauryl lactate, and fatty alcohols e.g., oleyl alcohol. Moreover, the product can be made crystal clear, so that the color used in the lipstick is shown to advantage and without distortion, both in the stick and on the lips; it gives a depth and a limpid color, which is extraordinarily attractive.

The resin, and these modifiers and solvents and the lower alcohols combine to form a solid gel system giving desirable hardness and strength for a lipstick, with easy release of a film when rubbed on the lips and the above-mentioned desirable transparency. Although it contains in its structure an appreciable amount of oily vehicle, it is stable and shows no evidence of syneresis.

This control of syneresis is attributed to the incorporation of the small amounts of lower alcohol, such as methanol, ethanol, iso propanol, n-propanol and n-butanol, etc. These also serve to improve the physical properties, particularly to cure brittleness of the gel and help to give softeness so that the color can be rubbed onto the lips.

The base solvents for the staining dyes can advantageously be such as will give maximum dissolution of the dyestuff, e.g., mono alkylolamide of mixed fatty acids from vegetable oil generally in the range 14–24 C-atoms (e.g. Loramine OM–101, which is predominantly peanut oil fatty acids amide), and dipropylene glycol methyl ether (e.g., Dowanol DPM). The alcohol used as above may also serve as dye solvent if alcohol soluble dyes are used; and the Dowanol or Loramine compounds may also serve as solvent for the resin.

In general the oil soluble dyes can be incorporated without difficulty because of their true solubility in the oleophilic system. Water soluble dyes can also be incorporated for additional color effect (e.g. Food, Drug & Cosmetic Certified Red #3). Such water soluble colors are made compatible in the gel by use of co-solvents e.g. those mentioned above. A large variety of dyes can be thus incorporated in accordance with this invention.

Other ingredients can be used as may be desired, but if the advantages of sparkle and depth of color are to be retained insoluble opaque ingredients should be avoided. Also waxes, which have been commonly used in lipstick compositions, should be avoided, as they create turbidity. A small amount of mineral oil, e.g. about 1–2% may be incorporated if a shiny film, or gloss, on the lips is desired. Castor oil can be used in higher percentage, even up to 50 or 60%. Fatty acid esters, e.g., mono laurates, ricinoleates, oleates, and linoleates may be used in the stick. Fatty alcohols, especially oleyl alcohol, linoleyl, and ricinoleyl and other unsaturated fatty alcohols can be used. Lauryl alcohol can be used effectively, but may be irritating to some people.

EXAMPLES OF FINISHED LIPSTICKS

| Formula No. | 1 | 2 | 3 | 4 |
|---|---|---|---|---|
| Ingredients: | | | | |
| Polyamide Resin (av. mol. wt. 8,000) | 16.28 | 25.00 | 20.00 | 20.00 |
| Polyamide Resin (av. mol. wt. 600–800) | | | 5.00 | 5.00 |
| Propylene Glycol Mono Laurate | 41.52 | 34.00 | 28.00 | 28.00 |
| Polyethylene Glycol 400 Mono Laurate | 4.88 | | | |
| Castor Oil | 24.43 | 18.80 | 12.60 | 12.60 |
| Lauryl Lactate | 1.64 | | | |
| Mono Alkylamide of mixed vegetable oil fatty acids "Loramine OM-101" | 3.92 | | | |
| D&C/Red #21 | 0.57 | 0.30 | 0.30 | 0.30 |
| Anhydrous Ethanol | 5.64 | 5.00 | | 5.00 |
| FD&C Red #3 | 0.12 | 0.10 | | |
| Lanolin Alcohols | | 5.80 | 8.00 | 8.00 |
| Dipropylene Glycol Methyl Ether "Dowanol DPM" | | 10.00 | 10.00 | 10.00 |
| Ethoxylated Lanolin Alcohols (5 moles ETO) | | | 10.10 | 10.10 |
| Isopropyl Alcohol Anhydrous | | | 5.00 | |
| Perfume Compound | 1.00 | 1.00 | 1.00 | 1.00 |

*Formula #1*

Heat and stir together the polyamide, propylene glycol mono laurate, polyethylene glycol 400 mono laurate, castor oil, and lauryl lactate until solution of the polyamide in other ingredients is accomplished.

The D&C Red #21 is added as a concentrated base solution in Loramine OM–101. The batch is stirred well. The ethanol-FD&C Red #3 solution is added at a temperature below the boiling point of ethanol (55–60° C.) and above the solidification point of the mass followed by the perfume and all is then mixed well. The mass is cast into conventional multi-cavity lipstick molds. The use of the two colors here in a transparent stick illustrates the advantage of our invention for attaining unlimited color selection by combining various dyes in the same composition. As further examples of dyes which can be thus used, alone or in combination, we may mention the U.S. Government certified colors, both Drug and Cosmetic and Food, Drug and Cosmetics, e.g. FD&C Blue #1, a triphenyl methane dye; the disodium salt of {[4-(N-ethyl p-sulfo benzylamino) phenyl] (2-sulfonium phenyl) methylene} [1-N-ethyl (N-p sulfobenzyl)-cyclohexadien-imine];

FD&C Yellow #5 (tartrazine), trisodium salt of 3-carboxy 5 hydroxy, 1-p-sulfo phenyl, 4-p-sulfo phenyl azo pyrazole;

D&C Orange #5, dibromo fluorescein;

D&C Red #27, tetra chloro, bromo fluorescein;

D&C Red #39, o,-p,-[β,β'-(dihydroxy diethyl diamino) phenyl azo] benzoic acid, a mono azo dye sometimes called Alba Red, and oil soluble dyes:

β-Carotene, a yellow dye;

D&C Red #17 (Sudan Red) 1-p-phenyl azo-phenyl-azo-2-naphthol;

D&C Red #18 (Oil Red), 1-xylyl azo-xylyl azo-2-naphthol (chiefly themp-xylyl isomer);

D&C Red #19 (Rhodamine B) 3-ethyl chloride of 9-o-carboxyphenyl-6-diethyl amino-3-ethyl imino-3-iso xanthine.

The fluorescein type dyes such as D&C Orange #5 and D&C Red #21 and D&C Red #27 act to stain the lips by diffusion from the applied film of the gel to the skin. The stain can be removed by bromo solvents or e.g. cold cream, but does not readily wear off. The other dyes serve as "top toners" to give the applied film the desired color and an effect in depth which is more than the mere stain.

Having been thus introduced to the improvement achieved by the present invention and to the manner of achieving it, others skilled in this are will now be enabled to make many other variations while utilizing the basic concept and still retaining the basic advantages common to the examples herein above described.

We claim:

1. A syneresis-resistant cosmetic coloring stick which comprises a gel the base of which is a polyamide resin which in the absence of other ingredients would be solid, a dye and a fatty acid ester wherein the acid contains from 12–18 C-atoms, and an anhydrous lower aliphatic alcohol.

2. A lipstick as defined in claim 1 which further comprises an alcohol co-solvent for the ester and the dye.

3. A lipstick as defined in claim 2 in which the resin solvent is a glycol ester of a higher fatty acid and the alcohol is an anhydrous lower aliphatic alcohol.

4. A lipstick as defined in claim 2 in which the resin solvent is a propylene ester of a 12 to 14 carbon atom fatty acid.

5. A lipstick which comprises a soft transparent solid oleophilic gel comprising a polyamide resin which in the absence of other ingredients would be a solid, a solvent for the resin, a stabilizer for the gel, and a hydrophilic dye solubilized in the gel.

6. A lipstick as defined in claim 5 in which the solvent is a glycol ester of a higher aliphatic carboxylic acid, and the stabilizer is a lower aliphatic alcohol.

7. A lipstick as defined in claim 5 in which the polyamide resin is present in amount 10–80% of the total composition.

8. A lipstick as defined in claim 5 in which the amount of dye in the lipstick is between 0.1% and 5%.

9. A lipstick as defined in claim 5 in which the resin is a solid mixture of solid polyamide resin of 2,000 to 10,000 molecular weight with a liquid resin of 600–800 molecular weight.

10. A lipstick which consists of a molded gel comprising polyamide resin which, in the absence of other ingredients would be solid, a solvent for the resin, a red dye, a co-solvent for the dye and the resin solvent.

11. A lipstick as defined in claim 10 in which the co-solvent of the dye is an alkylolamide of fatty acids of 14–24 C-atoms.

12. A lipstick as defined in claim 10 in which the co-solvent for the dye is di-propylene glycol methyl ether.

References Cited in the file of this patent

UNITED STATES PATENTS 2,853,422    Jarrett _____ Sept. 23, 1958

FOREIGN PATENTS 534,738    Canada _____ Dec. 18, 1956

OTHER REFERENCES

Cowan et al.: Chem. Abst., vol. 43, 1949, page 440(c).

Fishbach: The American Perfumer and Essential Oil Review, March 1955, vol. 65, No. 3, pages 31–34.